Feb. 3, 1959 R. W. SEAVEY 2,871,764
DEBURRING DEVICE
Filed Sept. 15, 1954 2 Sheets-Sheet 1

INVENTOR.
ROLAND W. SEAVEY
BY John Morton
HIS ATTORNEY.

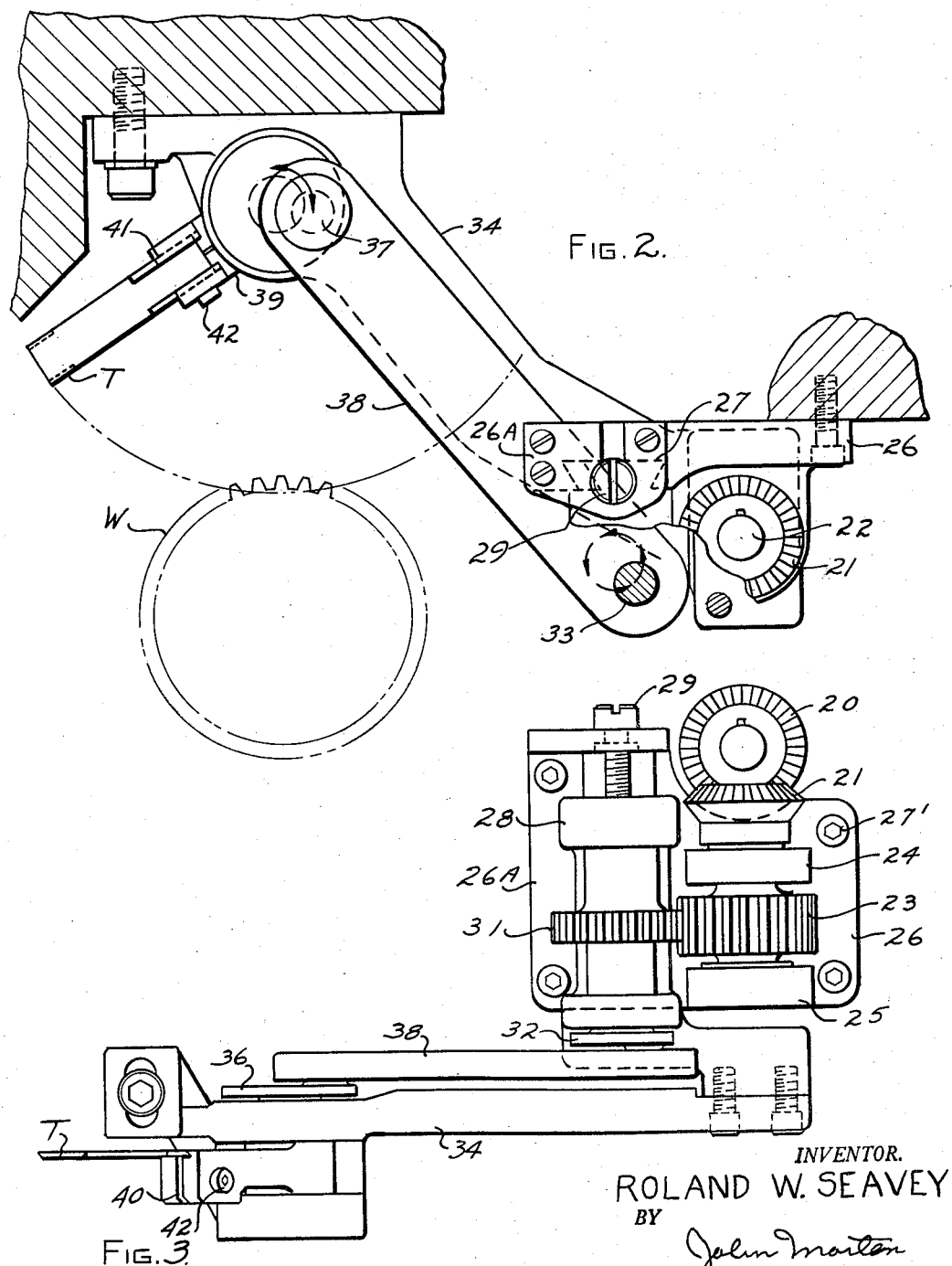

United States Patent Office 2,871,764
Patented Feb. 3, 1959

2,871,764

DEBURRING DEVICE

Roland W. Seavey, Weathersfield, Vt., assignor to The Fellows Gear Shaper Company, Springfield, Vt., a corporation of Vermont Application September 15, 1954, Serial No. 456,276

13 Claims. (Cl. 90—1.4)

The present invention relates to the art of gear manufacture and is more particularly concerned with a mechanism which is utilized during the cutting of teeth on a work piece to remove the burrs which are customarily formed on the end faces of the work gear.

In the embodiment shown and described herein the mechanism of the present invention may be used in a machine of the well-known Fellows type wherein teeth are formed on a work piece by engagement of a gear shaped cutter to which is given a reciprocatory motion relative to a work piece while both work and cutter are simultaneously rotated to obtain the requisite generating motion as is well known in the art. Such machines are of the type shown in Fellows Patent No. 1,463,806 dated August 7, 1923 and Miller Patent No. 2,034,765 dated March 24, 1936.

A primary object of the present invention is to eliminate a separate deburring operation which has hitherto been customary in the art. Such separate operations have been carried out manually or else by means of an independent machine, neither of which has been satisfactory because of the lack of speed in the first case and the heavy capital expenditure in the second case.

A second object is to provide mechanism for use on a gear shaper which will remove burrs from a work blank while the teeth are being formed thereon.

Another object is to provide mechanism which removes the burrs formed during the cutting action within a relatively short period of time after the formation of such burrs, at which time such burrs are in a heated condition and have not had time to become hardened and brittle which makes their removal more difficult and time consuming.

Still another object is to provide a burr removing mechanism which functions in coordinated relation with the cutting strokes of a reciprocating gear shaper cutter.

A final object is to provide a device for removing burrs from the end faces of a gear blank while the teeth are being cut and which is adjustable to cope with various sizes of work blanks and various cutter timing strokes.

In the drawings:

Fig. 2 is a plan view of the deburring mechanism dissociated from the gear shaper mechanism.

Fig. 3 is a front elevation of the deburring mechanism as shown in Fig. 2.

Like reference characters designate the same parts wherever they occurs in all the figures.

Figure 1:
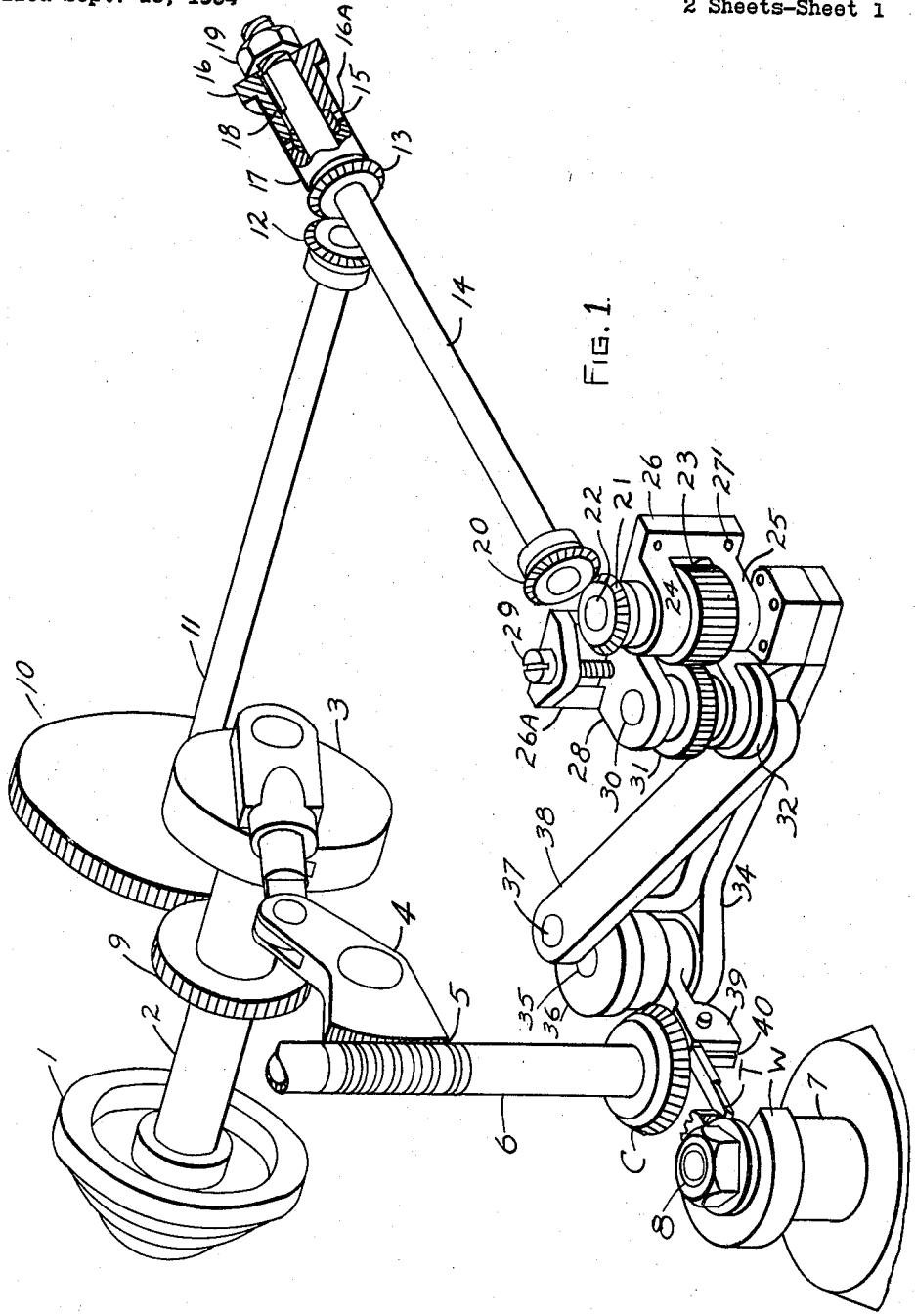
Fig. 1 is a schematic view of the present invention showing its relation to the customary reciprocating gear shaper cutter spindle and the work carrying spindle.

As shown in the drawings a motor, not shown, mounted in the base of the gear shaper drives a pulley 1 by means of a belt or chain. The pulley 1 is mounted on a shaft 2 which is housed in the usual cutter spindle head in the manner well known in the art. Fixed to the shaft 2 is a crank head 3 to which is fixed the crank mechanism generally designated as 4. This crank mechanism has the usual circular rack and cooperating structure 5 which serves to reciprocate the cutter spindle 6 at the lower end of which is mounted the gear shaper cutter C.

During reciprocatory cutting strokes cutter C is rotated in unison with work blank W and work arbor 7 while the teeth of cutter C pass through a peripheral segment of work W and form teeth in blank W conjugate to the width and depth of the teeth on cutter C. It is this cutting action which creates burrs during each cutting stroke of cutter C on the underneath side of work blank W. Nut 8 secures blank W to arbor 7.

A gear 9 is provided to rotate with pulley 1, shaft 2 and crank head 3 during the cutting operation. Gear 9 is mounted to rotate in mesh with and drive gear 10. Gears 9 and 10 constitute timing gears which may be changed to correlate the proper ratio of movement to oscillating burring tool T and reciprocating cutter C.

Gear 10 is fixed on and drives the shaft 11 which has mounted on its opposite end a bevel gear 12. Bevel gear 12 is fixed to shaft 11 to rotate therewith. Bevel gear 12 rotates in mesh with and drives a conjugate bevel gear 13. The gear 13 is loosely mounted on the shaft 14 which extends transversely across the machine at right angles to the shaft 11.

The bevel gear 13 has a hub portion 17 integral therewith. This hub portion has clutch teeth 15 on the end opposite to that on which the bevel gear 13 is formed. Keyed to the shaft 14 is a second half of a clutch member designated as 16. This second half clutch member 16 has teeth 16A thereon which cooperate with teeth 15 on the first mentioned clutch member 17. As shown at 18 the member 16 has a key therein which firmly secures it to rotate with the shaft 14 upon tightening of a nut 19 on the end of shaft 14.

Fixed to the opposed end of the shaft 14 is a bevel gear 20. This bevel gear 20 meshes with a bevel gear 21 which is fixed on shaft 22. Likewise fixed to shaft 22 is a spur gear 23. The shaft 22 is mounted in bearings 24 and 25 which are integral with a base or supporting member 26. This base or supporting member 26 is firmly secured to the base portion of the gear shaping machine which with the present device is used by means of bolts 27' or other securing means.

This supporting member 26 has an extension 26A thereon which provides ways 27 for a carriage member 28. This carriage member 28 may be moved along the ways 27 by means of a set screw 29 which is held against lengthwise movement in the member 26A by means of separate collars in the manner well known in the art. This set screw 29 is threaded into the carriage member 28 and it will be obvious that upon rotation of the set screw 29 that the carriage member 28 will be moved along the ways in the supporting member 26.

The carriage member 28 has bearings therein in which is rotatably mounted a shaft 30. To this shaft 30 is fixed a spur gear 31 which meshes with the gear 23 so as to be driven thereby. On the lower end of the shaft 30 is a hub portion 32 which has mounted thereon a crank pin 33 which is offset from the center of rotation of the shaft 30. This pin 33 constitutes a crank arm and cooperates with the deburring tool hereinafter referred to in the manner set forth below.

The carriage member 28 has an elongated member 34 fixed thereto. This member 34 has mounted on it and spaced from the shaft 30 a second shaft 35. This shaft 35 has a hub portion 36 thereon similar to the hub portion 32 integral with shaft 30. This hub portion 36 has an eccentric pin 37 thereon and integral therewith which constitutes a crank arm for cooperating with the shaft 30.

The eccentric pins 33 and 37 are joined by a crank arm 38.

It will be noted from the drawings that the eccentricity of the pin 33 from the center of rotation of the shaft 30 is less than the eccentricity of the pin 37 from the center of rotation of the shaft 35. The purpose of this difference in eccentricities is to obtain an oscillating movement on the shaft 35 while the shaft 30 is going through a complete rotation. Such a mechanism is necessary in order to correlate the movement of the reciprocating cutter spindle C with the oscillation of the deburring tool in the manner described.

The shaft 35 carries a tool support 39 thereon. This tool support 39 is fixed in any desirable manner to the shaft 35 so as to oscillate when the shaft 35 is oscillated. Fixed to the tool support 39 is a deburring tool T which may be fixed to the tool support in any appropriate manner. In the manner shown in the present embodiment the tool support 39 is split down the center as shown at 40 and is slotted at the upper end so as to provide a clamping portion. After the tool T is inserted in the portion 41 a set screw 42 is actuated to draw the two split portions of the tool holder 39 firmly together.

From the above it will be seen that as the cutting tool C reciprocates the shaft 11 will drive the shaft 14 which in turn will drive the shaft 22 on which the gear 23 is mounted. This gear 23 will drive the gear 31 which through the two crank arms and eccentric pin arrangements and the arm 38 will oscillate the tool support 39 in timed relation to the reciprocation of the cutter spindle. As the cutter spindle moves upwardly the deburring tool T will sweep across the bottom face of the work gear W and remove any burrs that have been formed thereon by the cutter C. By changing the gears 9 or 10 a different timed relation will result.

If it is desired to adjust the position of the oscillating arc of the tool T the nut 19 may be released and the clutch member 16 withdrawn from engagement with the clutch member 17. Then independent rotation may be imparted to the shaft 14 so as to control the place where oscillation of the tool T begins and ends.

The carriage 28 is adjustable in a vertical direction so as to accommodate different face widths of work blanks W. It will be seen upon rotation of the set screw 29 the carriage 28 and the elongated member 34 which carries the deburring tool T will be moved either upwardly or downwardly depending on the width of the face of the gear to be cut.

What I claim and desire to secure by Letters Patent is:

1. In a gear shaping machine, having a base, a cutter spindle, and a work spindle journalled in said base, means to reciprocate said cutter spindle relative to said work spindle and means to impart rotative generating movement to said cutter and work spindles, a device for removing burrs from a work piece held on said work spindle, said device consisting of a supporting member fixed to said base, a gear journalled on said supporting member, driving means for said gear, a carriage slideably mounted on said supporting member, a shaft rotatably supported on said carriage, a second gear fixed to said shaft and in mesh with said first mentioned gear, a crank fixed to said shaft, an elongated member extending from said carriage, a second shaft rotatably mounted on said elongated member and spaced from said shaft, a crank fixed to said second shaft, a crank arm connecting said cranks, a tool support fixed to said second shaft, and a deburring tool fixed to said tool support, said driving means being constructed and arranged so as to oscillate said tool support in time with the reciprocation of said cutter spindle whereby said deburring tool will contact the work piece alternately with a cutter on said cutter spindle.

2. In a machine of the character described the combination of a supporting structure, a drive gear journalled on said supporting structure, a carriage slidable on said supporting structure, a shaft rotatable on said carriage, a driven gear fixed to said shaft and meshing with said drive gear, a crank fixed to said shaft, a second shaft on said carriage spaced from said first mentioned shaft, a crank arm connecting said shafts, a tool support mounted on said second shaft, a deburring tool fixed to said tool support, means to rotate said drive gear whereby said tool support is oscillated, and means to adjust the position of the oscillation given to said tool support.

3. In a gear cutting machine having a reciprocating cutter spindle of the character described the combination of a base structure, a driving means mounted on said base structure, a carriage slideably mounted on said base structure, means to move said carriage, driven means on said carriage actuated by said driving means, a supporting member fixed to said carriage, a pivotally mounted member on said supporting member spaced from said driven means, means connecting said driven means to said pivotally mounted member, a tool support fixed to said pivotally mounted member, a deburring tool mounted on said tool support, and timing means for said driving means constructed and arranged so that movement is imparted to said tool support alternately with the reciprocations of said cutter spindle.

4. In a gear finishing machine having a cutter spindle, a gear shaper cutter on said spindle, a work spindle, means to rotate said spindles relative to each other and means to reciprocate one of said spindles relative to the other to obtain a cutting action, a deburring device to remove burrs from a work blank held on said work spindle simultaneously with formation of the teeth thereon, said deburring device consisting of a supporting member, a pivotally mounted tool support on said supporting member, a deburring tool fixed to said tool support, a rotatable shaft on said supporting member spaced from said tool support, means driving said tool support from said shaft, a driving means for said rotatable shaft, and means operable to impart movement to said tool support in timed relation to the relative reciprocation of said cutter and work spindles so that the deburring tool engages the work blank when the gear shaper cutter is withdrawn from engagement with the blank.

5. In a gear shaping machine, having a base, a cutter spindle, and a work spindle journalled in said base, means to reciprocate said cutter spindle relative to said work spindle and means to impart rotative generating movement to said cutter and work spindles, a device for removing burrs from a work piece held on said work spindle, said device consisting of a supporting member fixed to said base, a gear journalled on said supporting member, driving means for said gear, a shaft rotatably supported on said supporting member, a second gear fixed to said shaft and in mesh with said first mentioned gear, a crank fixed to said shaft, an elongated member extending from said supporting member, a second shaft rotatably mounted on said member and spaced from said first shaft, a crank fixed to said second shaft, a crank arm connecting said cranks, a tool support fixed to said second shaft, and a deburring tool fixed to said tool support, said driving means being constructed and arranged so as to oscillate said tool support in time with the reciprocation of said cutter spindle whereby said deburring tool will contact the work piece alternately with a cutter on said cutter spindle.

6. In a machine of the character described, having a reciprocatory cutter spindle, the combination of a base, a drive gear journalled on said base, a shaft rotatable on said base, a driven gear fixed to said shaft and meshing with said drive gear, a crank fixed to said shaft, a second shaft oscillatably mounted on said base spaced from said first mentioned shaft, a crank fixed on said second shaft, a crank arm connecting said shafts, a tool support mounted on said second shaft, a deburring tool fixed to said tool support, and means to rotate said drive gear constructed and arranged so that said deburring tool is oscillated in timed relation to the reciprocation of said cutter spindle.

7. In a machine of the character described, having a reciprocatory cutter spindle, the combination of a base, a drive gear journalled on said base, a shaft rotatable on said base, a driven gear fixed to said shaft and meshing with said drive gear, a crank fixed to said shaft, a second shaft oscillatably mounted on said base spaced from said first mentioned shaft, a crank fixed on said second shaft, said crank being of greater length than the crank on said first mentioned shaft, a crank arm connecting said shafts, a tool support mounted on said second shaft, a deburring tool fixed to said tool support, and means to rotate said drive gear constructed and arranged so that said deburring tool is oscillated in timed relation to the reciprocation of said cutter spindle.

8. In a gear shaping machine the combination of a base, a cutter spindle mounted in said base, a cutter fixed to said cutter spindle, means to reciprocate said cutter spindle, a work spindle mounted in said base, a deburring tool mounted on said base for movement past the end face of a work gear mounted on said work spindle so as to remove burrs formed on said end face by said cutter, and means operable in timed relation to the reciprocation of the cutter spindle to impart movement to said deburring tool so that burrs are removed from the teeth of the work piece while said teeth are being formed concurrently by said cutter.

9. In a gear shaping machine the combination of a base, a cutter spindle, means to impart a reciprocating movement to said cutter spindle, a work spindle mounted in said base, a deburring tool mounted on said base for movement past the end of a work gear mounted on said work spindle, means operable in timed relation to the reciprocation of the cutter spindle to impart movement to said deburring tool, and means connecting said cutter reciprocating means to said last named means so that burrs are removed from the work piece concurrently with the formation of teeth thereon.

10. In a machine of the character described the combination of a supporting structure, a cutter spindle mounted on said supporting structure, means to reciprocate said cutter spindle, a shaft oscillatable on said supporting structure, a tool support fixed to said shaft and oscillatable therewith, means to oscillate said shaft, said means including a second shaft spaced from said first mentioned shaft and journalled on said supporting structure, gearing to drive said second shaft and timing gears to drive said gearing so as to periodically oscillate said tool support, said timing gears being in geared relation to said cutter spindle reciprocating means so that said tool support is oscillated in timed relation to the reciprocation of said cutter spindle.

11. In a machine of the character described having a cutter spindle, means to reciprocate said cutter spindle, and a work spindle adjacent to said cutter spindle, the combination of a supporting member, a shaft journalled in said supporting member, a crank fixed to said shaft, a second shaft oscillatably mounted on said supporting member and spaced from said first mentioned shaft, a crank fixed on said second shaft, a crank arm connecting said shafts, a tool support mounted on said second shaft, a deburring tool fixed to said tool support and means to rotate said first mentioned shaft constructed and arranged so that said deburring tool is oscillated in timed relation to the reciprocation of said cutter spindle so that burrs may be removed from a work piece mounted on said work spindle concurrently with the formation of teeth thereon.

12. In a machine of the character described having a cutter spindle, means to reciprocate said cutter spindle, and a work spindle adjacent to said cutter spindle, the combination of a supporting member, a shaft journalled in said supporting member, a crank fixed to said shaft, a second shaft oscillatably mounted on said supporting member and spaced from said first mentioned shaft, a crank fixed on said second shaft, the length of said crank being greater than the length of said first mentioned crank, a crank arm connecting said shafts, a tool support mounted on said second shaft, a deburring tool fixed to said tool support and means to rotate said first mentioned shaft constructed and arranged so that said deburring tool is oscillated in timed relation to the reciprocation of said cutter spindle so that burrs may be removed from a work piece mounted on said work spindle concurrently with the formation of teeth thereon.

13. In a machine of the character described having a cutter spindle, means to reciprocate said cutter spindle, and a work spindle adjacent to said cutter spindle, the combination of a supporting member, a shaft journalled in said supporting member, a crank fixed to said shaft, a second shaft oscillatably mounted on said supporting member and spaced from said first mentioned shaft, a crank fixed on said second shaft, the length of said crank being greater than the length of said first mentioned crank, a crank arm connecting said shafts, a tool support mounted on said second shaft, a deburring tool fixed to said tool support, means to rotate said first mentioned shaft constructed and arranged so that said deburring tool is oscillated in timed relation to the reciprocation of said cutter spindle so that burrs may be removed from a work piece mounted on said work spindle concurrently with the formation of teeth thereon, and means cooperating with said last named means to adjust the position of oscillation of said deburring tool.

References Cited in the file of this patent

UNITED STATES PATENTS

| | | |
|---|---|---|
| 1,975,151 | Hill | Oct. 2, 1934 |
| 2,107,543 | Miller | Feb. 8, 1938 |
| 2,184,232 | Christman | Dec. 19, 1939 |
| 2,430,375 | Upton | Nov. 4, 1947 |